United States Patent [19]

Marton et al.

[11] Patent Number: 5,116,262
[45] Date of Patent: May 26, 1992

[54] MOUNTING SYSTEM FOR ELECTRICAL DEVICES

[75] Inventors: Fred S. Marton; William R. Segar, both of Monroeville; William E. Schmitz, Pittsburgh, all of Pa.

[73] Assignee: AEG Westinghouse Transportation Systems, Inc., Pittsburgh, Pa.

[21] Appl. No.: 533,278

[22] Filed: Jun. 4, 1990

[51] Int. Cl.$^5$ .................................................. H01R 9/22
[52] U.S. Cl. ........................................ 439/709; 439/532
[58] Field of Search ............... 439/586, 590, 592, 709, 439/561, 529, 533, 532, 534, 710, 711, 712, 544, 278, 426, 191-193, 198, 552, 921

[56] References Cited

U.S. PATENT DOCUMENTS

| | | | |
|---|---|---|---|
| 2,872,655 | 2/1959 | Damon | 439/586 |
| 2,948,773 | 8/1960 | Hawes | 439/552 |
| 3,086,074 | 4/1963 | Just et al. | 439/552 |
| 3,202,757 | 8/1965 | Carlson et al. | 439/552 |
| 3,214,512 | 10/1965 | Deakin | 439/552 |
| 3,448,429 | 6/1969 | Szeremy et al. | 439/552 |
| 3,506,947 | 4/1970 | Leskosek | 439/532 |
| 3,904,812 | 9/1975 | Daffron | 439/278 |
| 3,989,338 | 11/1976 | Grosser | 439/426 |
| 4,073,563 | 2/1978 | Balley et al. | 439/532 |
| 4,711,519 | 12/1987 | Smulders | 439/552 |
| 4,734,057 | 3/1988 | Noschese | 439/586 |
| 4,773,867 | 9/1988 | Keller et al. | 439/532 |

Primary Examiner—Larry I. Schwartz
Assistant Examiner—Hien D. Vu
Attorney, Agent, or Firm—Spencer, Frank & Schneider

[57] ABSTRACT

An arrangement for mounting high voltage electrical devices. A generally planar member made of electrically insulating material is provided with a uniform grid of recesses. Mounting plugs are selectively insertable into desired ones of the recesses of the member. Each mounting plug includes an insulating body which is configured to be removably fixed in a desired one of the recesses of the member. A conductive pin extends through the insulating body and presents a mounting terminal on each side of the member when the plug is inserted into one of the recesses. Each mounting terminal on at least one side of the member is configured for affixing thereto both an electrical lead and a mounting device for an electrical component to be attached to the member.

13 Claims, 2 Drawing Sheets

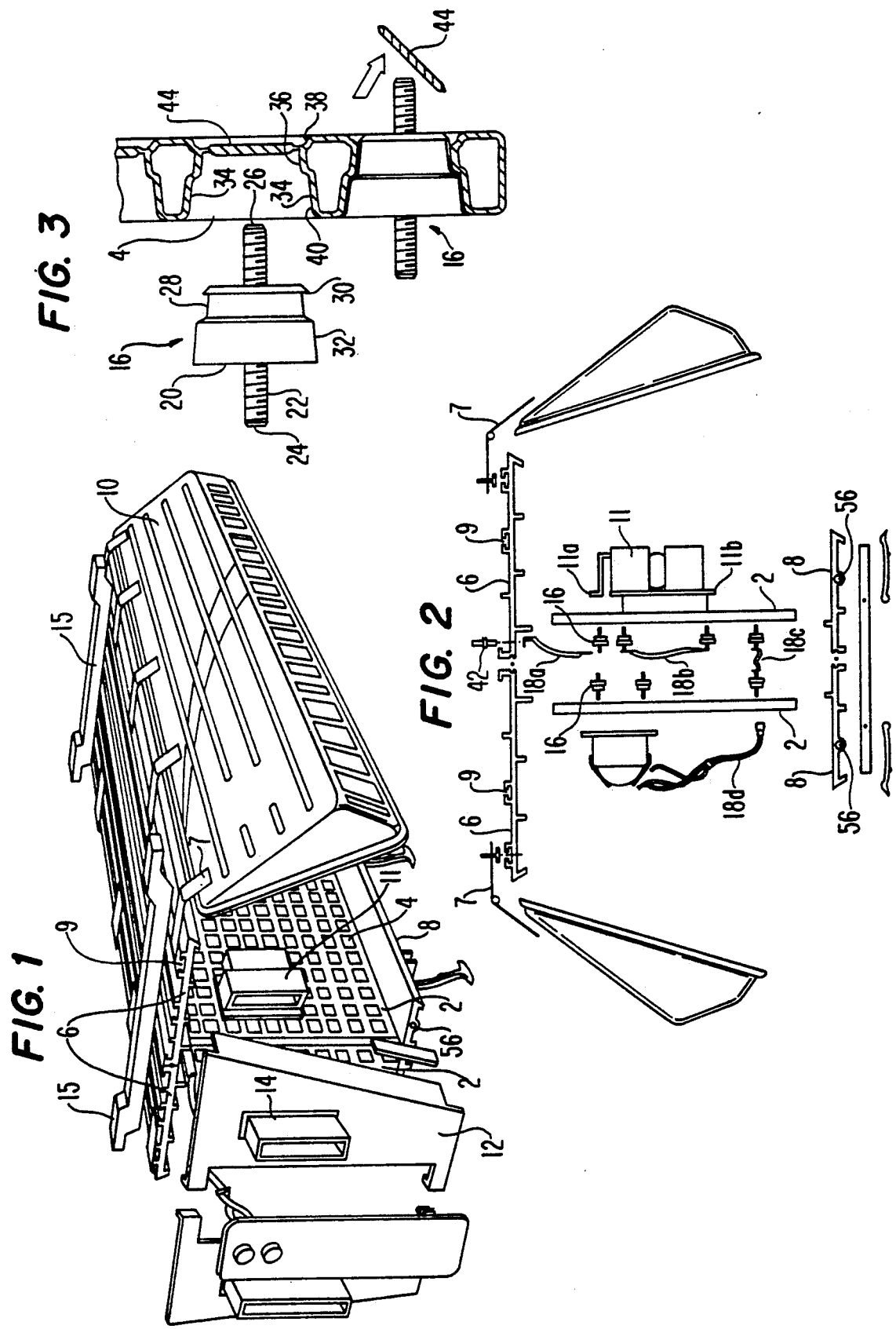

MOUNTING SYSTEM FOR ELECTRICAL DEVICES

BACKGROUND OF THE INVENTION

The present invention relates to an arrangement for mounting electrical devices, and more particularly for mounting high voltage electrical devices.

Large pieces of electrically powered equipment, such as transit cars, typically employ a plurality of electronic control devices which are housed in so-called "control packages". It has been a common practice in assembling these control packages to mount the control devices in a unique way for each application or variation of a particular application. This has in turn required that the control package housing the devices be specially designed to accommodate each new configuration of the electrical devices. Often, the control package must be specially assembled for the given task it performs for the electrical equipment. This has caused problems because stocking a number of different types of control packages or custom designing control packages is expensive.

SUMMARY OF THE INVENTION

It is therefore an object of the present invention to provide an arrangement for mounting electrical control devices which is modular and allows great flexibility in the configuration of the electrical devices to be mounted in the package.

The above and other objects are accomplished according to the invention by the provision of an arrangement for mounting high voltage electrical devices, including: a generally planar member made of electrically insulating material and including a uniform grid of recesses; and mounting plugs selectively insertable into desired ones of the recesses of the member, each mounting plug comprising an insulating body which is configured to be removably fixed in a desired one of the recesses of the member and a conductive pin extending through the insulating body and presenting a mounting terminal on each side of the member when the plug is inserted into one of the recesses, each mounting terminal on at least one side of said member being configured for affixing thereto both an electrical lead and a mounting means for an electrical component to be mechanically attached to the member.

BRIEF DESCRIPTION OF THE DRAWINGS

FIG. 1 is a perspective view of one embodiment of an arrangement for mounting electrical devices according to the invention.

FIG. 2 is an exploded end view of the embodiment of FIG. 1.

FIG. 3 is a enlarged partial sectional view showing the grid member and mounting plugs shown in FIG. 2.

DESCRIPTION OF THE PREFERRED EMBODIMENT

Figure 4:
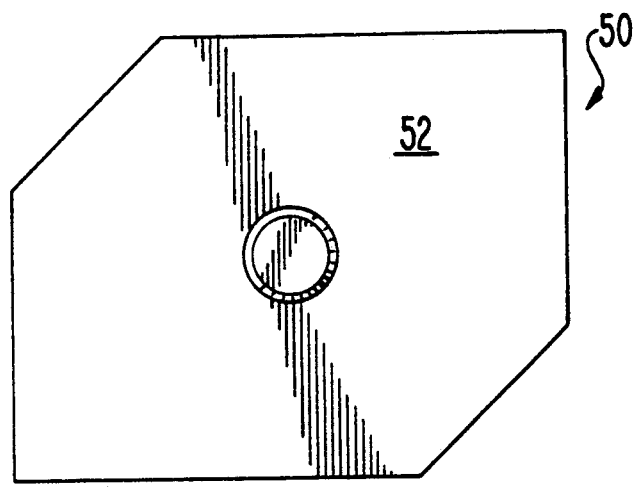
FIG. 4 is a top view of a component of the mounting arrangement shown in FIG. 1.

FIG. 1 illustrates the mounting arrangement of the invention when used as part of a control unit for a transit car or other equipment utilizing a number of electrical components mounted in close proximity to one another. As shown in FIG. 1, the mounting arrangement includes one or more planar members or grids 2, each having a uniform distribution of recesses 4. Grids 2, which may be made of an insulating material, such as a polycarbonate plastic, are suitably attached at the top to upper extrusions 6 and at the bottom to lower extrusions 8. Covers 10 are articulated to upper extrusions 6 by way of hinges 7 for providing access to electrical components 11 attached to the grids in accordance with the invention as explained below. End pieces 12, which may be provided with electrical connectors 14, are attached to upper and lower extrusions 6 and 8 and together therewith, along with covers 10, form a housing for grids 2. The entire arrangement is attached to the underside of, for example, a transit car by way of brackets 15.

As illustrated in FIGS. 2 and 3, and in accordance with the invention, there are provided mounting plugs 16 which are releasably inserted into selected recesses 4 and which are used for fastening electrical components 11 to the grid and for attachment of high voltage electrical leads such as leads 18a, 18b and 18c. Each mounting plug 16 includes an insulating body 20 and a conductive pin 22 extending therethrough to provide mounting terminals 24 and 26 projecting from each side of the insulating body. Each mounting terminal is preferably provided with threads for engaging a fastening device having complementary threads for attaching an electrical component 11 or an electrical lead, or both. Insulating body 20 has a circumferential groove 28 located between a first circumferential portion 30 and a second circumferential portion 32, the latter having a larger radial dimension than that of first circumferential portion 30.

Grid 2 is provided with walls 34 defining recesses 4 and having complementary shaped surfaces for receiving and engaging the insulating body of a mounting plug 16. In particular, walls 34 are provided with a raised region 36 for engaging groove 28 of the insulating body, and recessed regions 38 and 40 for engaging first and second circumferential portions 30 and 32 of the insulating plug. Insulating bodies 20 thus fit snugly into recesses 4 for providing a firm mechanical support for mounting electrical devices.

As shown in FIG. 2, the electrical devices are preferably provided with brackets 11a or extensions 11b having suitable openings for receiving mounting terminals 26. The brackets or extensions may also serve as electrical contacts for the electrical device. Suitable fastening devices, such as a customary nut, may be used to secure the electrical component to mounting terminal 26, and thus to grid 2. Mounting plugs 2 are uniformly oriented with the small diameter circumferential portion 30 being adjacent the electrical component and the larger diameter circumferential portion 32 being disposed remotely from the electrical component so as to prevent the mounting plug from being pulled through recess 4 by the weight of the electrical component. On the other hand, the mounting plugs can be removed from recess 4 relatively easily by pulling on them in the leftward direction in FIG. 2 so that the smaller diameter portion is forced back through recess 4.

Insulating bodies 20 are preferably made of a resilient rubber or plastic and may have a rectangular, cylindrical or any other suitable cross-section, so long as recesses 4 are correspondingly shaped. Conductive pins 22 are sized to provide the required mechanical strength to support the electrical components as well as to handle high voltages.

As shown in FIG. 2, the wiring interconnecting the electrical components with each other and with points external to the housing is conveniently performed by way of mounting terminals 26 on the opposite side of grid 2 from the electrical components. Electrical leads may be connected in any manner as required for the particular configuration of electrical components. For example, electrical lead 18a is shown connecting a mounting terminal 26 to an electrical connector 42 which is in turn connected to a point (not shown) external of the housing. Alternatively, electrical leads, such as lead 18b, may be used to connect mounting terminals 26 on the same grid, or as shown by lead 18c, to connect mounting terminals 26 attached to adjacent grids so as to interconnect electrical components mounted on the respective grids. Further, mounting terminals 26 on the same side of grid 2 as the electrical component may be used to connect leads from the electrical component, such as lead 18d shown in FIG. 2. Electrical connector 14 may be used to bring in low voltage connections to the various electrical components.

With the use of the grid and mounting plugs according to the invention, the physical arrangement of the electrical components may be easily modified without redesigning the whole mounting structure. Additionally, the dimensions of grid 2 may be varied as required for a particular application, in which case only the length of the upper and lower extrusions and of the covers need be adjusted accordingly.

As may be appreciated from the above, the mounting plugs are versatile in that each plug may be used to both mount an electrical component to the grid and to provide an electrical connection either by way of an electrical lead or by way of the mounting element of the electrical device if that element also serves as an electrical terminal, and alternatively, the mounting plugs may be used to provide any one of such functions individually.

Further, grid 2 may be made so that recesses 4 comprise preformed openings or, alternatively, in some cases it may be desirable to include frangible plates 44, as shown in FIG. 3, which are punched out as required to form an opening into which a mounting plug 16 may be inserted. As used herein, the term recess is intended to comprehend both a preformed opening and an opening covered by a frangible plate as described above.

Figure 5:
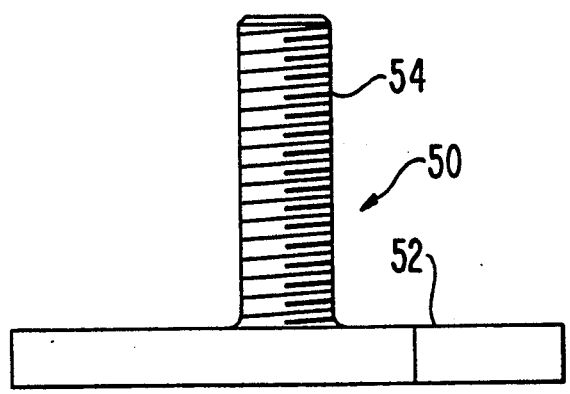
FIG. 5 is a side view of the component shown in FIG. 4.

Referring again to FIGS. 1 and 2, upper extrusions 6 have longitudinal channels 9 formed therein. Channels 9 cooperate with a slider piece 50, shown in FIGS. 4 and 5, which has a generally square shaped head portion 52 having two opposing corners clipped off and a threaded bolt portion 54 extending centrally from head portion 52. By virtue of the clipped corners, head portion 52 of slider piece 50 can be inserted into channel 9 and rotated a quarter turn so that head portion 50 becomes slidably engaged in channel 9 without dropping out of the channel. Bolt portion 54 is passed through an opening (not shown) appropriately provided in brackets 15 and secured by way of a conventional nut (not shown). Before tightening down the nut the position of the entire housing may be slidably adjusted in the longitudinal direction underneath the transit car by way of slider piece 50 and channel 9.

According to a further aspect of the invention, lower extrusions 8 have extruded therein air pipes 56 as shown in FIGS. 1 and 2. In operation, air pipes 56 can be connected to a source of pressurized air (not shown). Any components attached to grid 2 which require pressurized air for their operation can have access to such pressurized air by appropriately tapping into one of air pipes 56.

It will be understood that the above description of the present invention is susceptible to various modifications, changes and adaptations, and the same are intended to be comprehended within the meaning and range of equivalents of the appended claims.

What is claimed is:

1. An arrangement for mounting high voltage electrical devices, comprising:

a generally planar member made of electrically insulating material and including a uniform grid of recesses; and mounting plugs selectively insertable into desired ones of the recesses of said member, each mounting plug comprising an insulating body which is configured to be removably fixed in a desired one of the recesses of said member and a conductive pin extending through said insulating body and presenting a mounting terminal on each side of said member when the plug is inserted into one of said recesses, each mounting terminal on at least one side of said member including threads for accommodating a fastening device with complementary threads for affixing thereto both an electrical lead and a mounting means for an electrical device to be mechanically attached to said member.

2. The arrangement according to claim 1, wherein said member includes a frangible portion in each of said recesses which can be punched prior to insertion of a mounting plug.

3. The arrangement according to claim 1, wherein said member comprises a polycarbonate.

4. The arrangement according to claim 1, wherein said member has a plurality of walls defining the recesses, each recess wall comprising a raised section which extends into the recess and the insulating body of each said mounting plug has a circumferential groove for accommodating the raised wall section of a respective one of the recesses in said member.

5. The arrangement according to claim 4, wherein said insulating body has a first circumferential portion with a first radial dimension on one side of said groove and a second circumferential portion on the other side of said groove which has a second radial dimension which is larger than the first radial dimension, wherein said mounting plugs are inserted into the recesses so that the first and second circumferential portions are uniformly oriented in the same direction, respectively.

6. The arrangement according to claim 5, wherein, on opposite sides of the raised wall section, said walls defining the recesses are shaped to have first and second complementary portions for engaging said first and second circumferential portions, respectively, of said insulating body.

7. The arrangement according to claim 1, wherein said insulating body comprises a resilient material.

8. The arrangement according to claim 7 wherein said material comprises one of rubber and plastic.

9. An arrangement for mounting high voltage electrical devices, comprising:

a generally planar member made of electrically insulating material and including an uniform grid of recesses;

mounting plugs selectively insertable into desired ones of the recesses of said member, each mounting plug comprising an insulating body which is configured to be removably fixed in a desired one of the recesses of said member and a conductive pin extending through said insulating body and presenting a mounting terminal on each side of said member when the plug is inserted into one of said recesses, each mounting terminal on at least one side of said member being configured for affixing thereto both an electrical lead and a mounting means for an electrical device to be mechanically attached to said member;

a housing enclosing said planar member, said housing including upper and lower members between which said planar member is secured, one of said upper and lower members including an outer surface having a longitudinal channel formed therein; and a means for fastening said housing to an external structure, said means including a component slidably engageable with said channel so that the position of said housing can be longitudinally adjusted with respect to the external structure.

10. The arrangement according to claim 9, wherein said component of the fastening means is arrestable in said channel so that the position of the housing can be fixed with respect to the external structure.

11. An arrangement for mounting high voltage electrical devices, comprising:

a generally planar member made of electrically insulating material and including a uniform grid of recesses;

mounting plugs selectively insertable into desired ones of the recesses of said member, each mounting plug comprising an insulating body which is configured to be removably fixed in a desired one of the recesses of said member and a conductive pin extending through said insulating body and presenting a mounting terminal on each side of said member when the plug is inserted into one of said recesses, each mounting terminal on at least one side of said member being configured for affixing thereto both an electrical lead and a mounting means for an electrical device to be mechanically attached to said member;

a housing enclosing said planar member, said housing including upper and lower members between which said planar member is secured, one of said upper and lower members including an outer surface having a longitudinally channel formed therein; and means for fastening said housing to an external structure, said means including a component slidably engageable with said channel so that the position of said housing can be longitudinally adjusted with respect to the external structure wherein one of said upper and lower members includes piping formed therein for carrying pressurized gas which can be tapped for use by a component mounted on said planar member.

12. The arrangement according to claim 11, wherein said upper and lower members comprise extrusions and said channel and said piping are formed by an extrusion.

13. An arrangement for mounting high voltage electrical devices, comprising:

a generally planar member made of electrically insulating material and including a uniform grid of recesses;

mounting plugs selectively insertable into desired ones of the recesses of said member, each mounting plug comprising an insulating body which is configured to be removably fixed in a desired one of the recesses of said member and a conductive pin extending through said insulating body and presenting a mounting terminal on each side of said member when the plug is inserted into one of said recesses, each mounting terminal on at least one side of said member being configured for affixing thereto both an electrical lead and a mounting means for an electrical device to be mechanically attached to said member; and a housing enclosing said planar member, said housing including upper and lower members between which said planar member is secured, wherein one of said upper and lower members includes piping formed therein for carrying pressurized gas which can be tapped for use by a component mounted on said planar member.

* * * * *